April 28, 1953 W. B. BERNARD 2,636,928
RADIO FREQUENCY ADMITTANCE MEASURING APPARATUS
Filed July 31, 1950 2 SHEETS—SHEET 1

INVENTOR
WILLIAM B. BERNARD

BY

ATTORNEY

INVENTOR
WILLIAM B. BERNARD

Patented Apr. 28, 1953

2,636,928

UNITED STATES PATENT OFFICE 2,636,928

RADIO FREQUENCY ADMITTANCE MEASURING APPARATUS

William B. Bernard, Miami, Fla.

Application July 31, 1950, Serial No. 176,888

7 Claims. (Cl. 175—183)

(Granted under Title 35, U. S. Code (1952), sec. 266)

This invention relates in general to the art of electrical instrumentation and, more particularly, concerns novel means for determining the electrical parameters of complex circuits at operational frequencies.

Bridge methods, together with ammeter-voltmeter methods for measuring the electrical characteristics of complex circuits at radio frequencies, have been well known in the electrical measurements art. However, in practice, these methods have presented numerous difficulties and disadvantages which never have been fully overcome. For example, when using a bridge or other conventional null method at radio frequencies, the generator, bridge and detector circuits must be very carefully shielded because the power at the detector is much smaller than the power fed into the bridge. With insufficient shielding, the results of the measurements will be in error. Also, at radio frequencies, ammeter-voltmeter methods are usually not sufficiently sensitive, and further, may upset the circuits being measured, the consequence being misleading and inaccurate results.

Accordingly, it is a primary object of the present invention to provide for accurate determination of the electrical parameters of complex circuits at radio frequencies without the attendant disadvantages of the above-mentioned prior art procedures.

Another object of the present invention is to provide simple, portable and conveniently operable apparatus for measuring the radio frequency characteristics of electrical circuits.

A further object of the present invention is to provide method and means for measuring the radio frequency characteristics of complex circuits having application to measurements over a wider range of values than devices of similar function currently available.

A still further object of the present invention is to provide a device for measuring radio frequency characteristics of circuit components having a mechanical structure capable of being readily adapted to widely varying conditions without affecting operation thereof.

Figure 1:
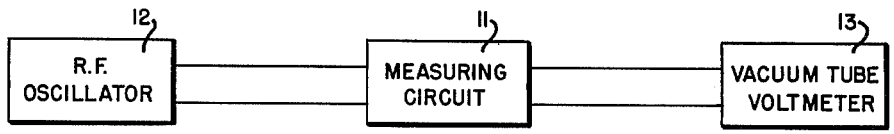
Figure 2:
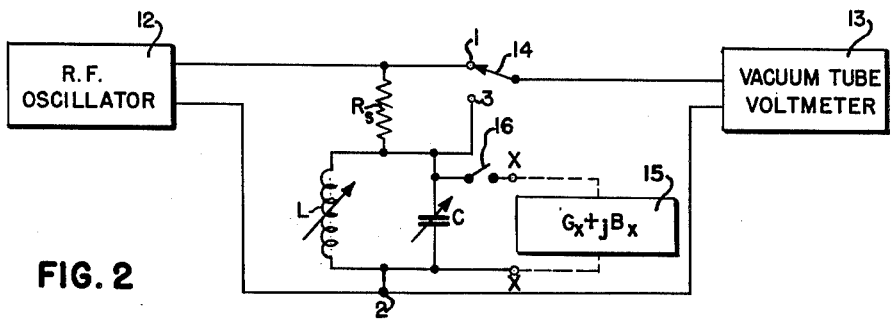
Figure 3:
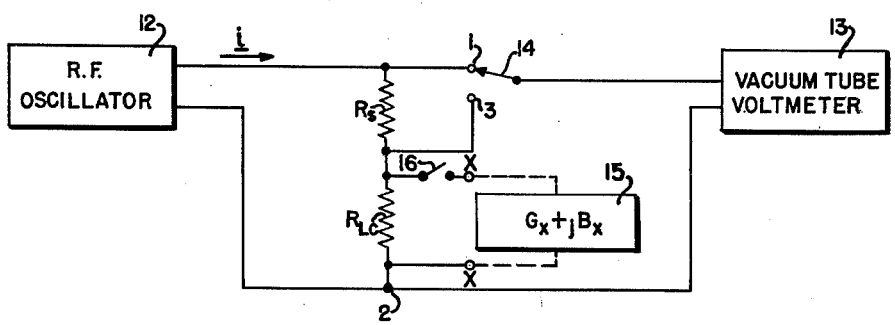
Figure 4:
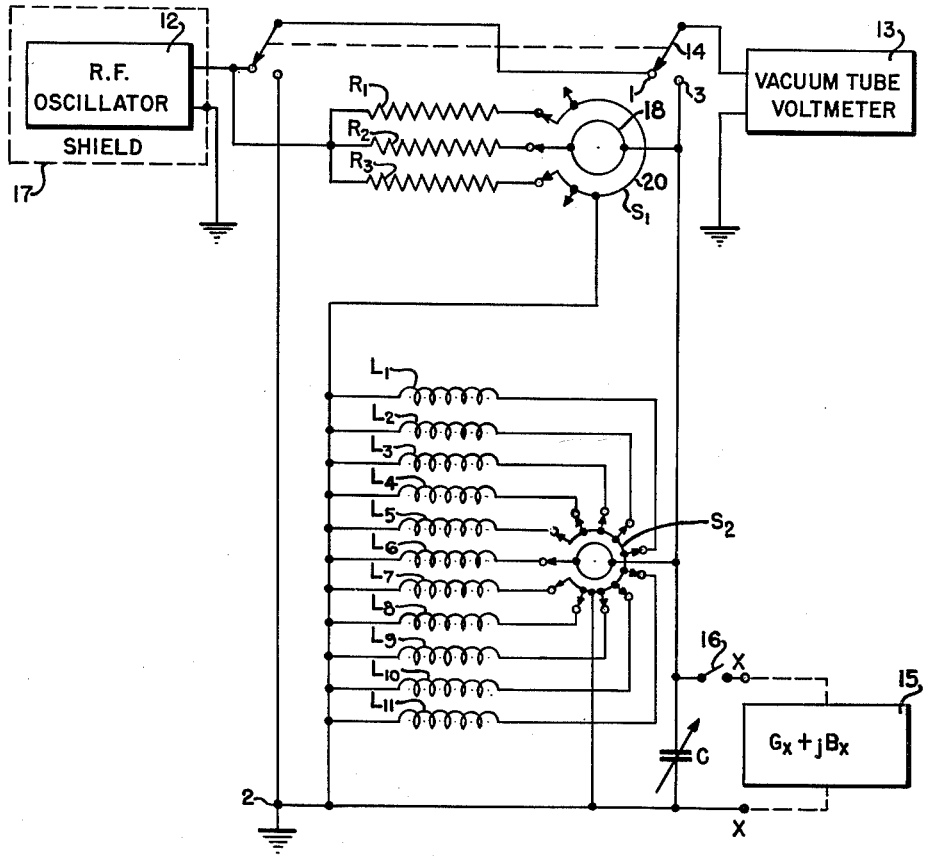

These and other objects of the present invention will be apparent from the following specification when taken in conjunction with the accompanying drawings, in which Fig. 1 is a block diagram illustrating the basic components of the present invention;

Fig. 2 is a diagram substantially the same as Fig. 1, except that one of the components thereof has been illustrated schematically as an aid in the explanation and exposition of the basic principles of operation of the invention;

Fig. 3 is a circuit diagram similar to Fig. 2, except that the schematically illustrated component of Fig. 2, for a given condition of operation, has been illustrated in equivalent form, as an aid in developing the explanation of the operation of the invention; and Fig. 4 is a complete schematic circuit diagram of an embodiment of the present invention, illustrating a possible, practical and manufacturable arrangement thereof.

Referring now to the drawing, there are illustrated in Figs. 1 through 4, inclusive, in progressive stages of detail, the various features of the present invention. With specific reference to Fig. 1, the basic elements of the invention comprise a measuring circuit 11 energized from a radio frequency oscillator 12 and a suitable indicator, as for example, a vacuum tube voltmeter 13 for visually presenting certain information pertinent to the measuring circuit 11. In Figs. 2, 3 and 4, radio frequency oscillator 12 and vacuum tube voltmeter 13 have again been illustrated in block form as in Fig. 1, since the specific embodiments of these elements do not constitute essential features of the present invention. However, in Figs. 2 and 3 measuring circuit 11 of Fig. 1 has been illustrated schematically for purposes of explaining basic principles of operation. In Fig. 4 a full schematic diagram of one possible embodiment of the measuring circuit has been illustrated for purposes of indicating how this invention may be commercially practiced.

The particular embodiments of the present invention disclosed are described hereinafter in terms of their usefulness in determining the admittance characteristics of a circuit being measured; although it is obvious that once the admittance characteristics of a circuit have been determined, the results are easily converted, if desired, to corresponding impedance characteristics.

Referring now, in particular, to Fig. 2, the radio frequency oscillator 12 is coupled to input terminals 1 and 2 of the measuring circuit. A standard resistor $R_s$ is coupled between terminals 1 and 3 and a parallel circuit comprising inductor L and capacitor C is coupled between terminals 3 and 2 in series with $R_s$. The inductance and capacitance, respectively, of inductor L and capacitor C are adjustable, and further, the capacitor C is calibrated. Vacuum tube voltmeter 13 is coupled to the measuring circuit through terminal 2 and either terminals 1 or 3 depending upon the position of the switch 14.

The unknown circuit 15 is coupled to terminals X—X as shown. The admittance of circuit 15 may be represented by the expression $G_x+jB_x$ where $G_x$ is the conductance of circuit 15;
$B_x$ is the susceptance of circuit 15; and
$j$ is the complex operator which is mathematically equivalent to $\sqrt{-1}$.

Switch 16 is provided to disconnect circuit 15 from the measuring circuit during certain measuring operations which will be described. If desired, switch 16 may be omitted and circuit 15 disconnected at terminals X—X.

In operation, the first step in determining the admittance, $G_x+jB_x$, of an unknown circuit 15 is the establishment of what will be hereinafter referred to as a first resonant condition. At the first resonant condition, the unknown circuit 15 of admittance $G_x+jB_x$ is not connected, and the parallel inductor L and capacitor C circuit between terminals 3 and 2 is adjusted to resonance, as indicated by a maximum voltage reading of the vacuum tube voltmeter 13, the meter 13 at this time being coupled to terminal 3 through switch 14. The voltage appearing across terminals 2 and 3 and the value of the capacitance of capacitor C at this resonant condition will hereinafter be referred to respectively as $V_{32a}$ and $C_1$.

The voltage appearing across terminals 1 and 2, hereinafter referred to as $V_{12}$, is then determined. This step is obviously made by changing the position of the switch 14 from terminal 3 to terminal 1 and reading the voltmeter 13.

The next step is the establishment of a second resonant condition. In establishing the second resonant condition, the unknown circuit 15 being measured, $G_x+jB_x$, is connected to the measuring circuit by closing switch 16, thereby rendering the newly formed circuit between terminals 3 and 2 nonresonant, provided, of course, that $B_x$ is not equal to zero. The capacitor C is then readjusted to reestablish resonance between terminals 3 and 2. It should be emphasized at this point that, in re-resonating the circuit, the inductance of inductor L is not changed for a reason that will hereinafter be apparent. The capacitance of capacitor C and the voltage appearing across the terminals 2 and 3 as obtained by voltmeter 13 at this second resonant condition will hereinafter be referred to, respectively, as $V_{32b}$ and $C_2$.

It is well known in the art that, at any one of the resonant conditions such as described here, the entire circuit between terminals 3 and 2 may be replaced by an equivalent effective resistor representing all the losses between points 3 and 2 at that resonant condition. For example, the circuit between terminals 3 and 2 at the first resonant condition can be replaced by an equivalent resistor $R_{LC}$, which represents all the losses of the inductor L and capacitor C elements at this resonant condition. The equivalent circuit of Fig. 2 at the first resonant condition (with the unknown 15 not connected) is illustrated in Fig. 3. In Fig. 3 the current from the oscillator 12, designated as $i$, flows through resistor $R_s$ and the equivalent resistor $R_{LC}$. Utilizing this fact and also the fact that the capacitance of the capacitor C is adjustable without variation in its resistance, the conductance $G_{LC}$ of parallel inductor L and capacitor C circuit at any value of the capacitance of capacitor C may be determined as follows:

$$V_{12}=i(R_s+R_{LC})$$
$$V_{32a}=iR_{LC}$$
$$\frac{V_{12}}{V_{32a}}=\frac{R_s+R_{LC}}{R_{LC}}=\frac{R_s}{R_{LC}}+1$$
$$\frac{R_s}{R_{LC}}=\frac{V_{12}}{V_{32a}}-1$$

Replacing $R_{LC}$ by its equivalent $$\frac{1}{G_{LC}}$$

$$G_{LC}R_s=\frac{V_{12}}{V_{32a}}-1$$

$$G_{LC}=\frac{1}{R_s}\left(\frac{V_{12}}{V_{32a}}-1\right)$$

From this equation it is clear that, as long as the circuit included between terminals 2 and 3 is resonant, the voltage thereacross is related to the conductance of that circuit.

Therefore, when the unknown circuit 15 is connected to the measuring circuit through switch 16 and the capacitor C has been adjusted to establish the second resonant condition, the voltage reading of the voltmeter 13 is indicative of the total conductance of the newly formed circuit between terminals 3 and 2, which in this case is the algebraic sum of the conductance $G_{LC}$ and the conductance $G_x$ of the circuit 15 being measured. However, since the conductance $G_{LC}$ has already been determined, the conductance $G_x$ is obtained simply by subtracting $G_{LC}$ from the total determined conductance, which incidentally is determined in exactly the same manner as conductance $G_{LC}$, as evidenced by the formula $$G_{LC}+G_x=\frac{1}{R_s}\left(\frac{V_{12}}{V_{32b}}-1\right)$$

or $$G_x=\frac{1}{R_s}\left(\frac{V_{12}}{V_{32b}}-1\right)-G_{LC}$$
$$=\frac{1}{R_s}\left(\frac{V_{12}}{V_{32b}}-1\right)-\frac{1}{R_s}\left(\frac{V_{12}}{V_{32a}}-1\right)$$
$$=\frac{V_{12}}{R_sV_{32b}}-\frac{V_{12}}{R_sV_{32a}}$$
$$=\frac{V_{12}}{R_s}\left(\frac{1}{V_{32b}}-\frac{1}{V_{32a}}\right)$$

Also, in conformance with established circuit theory, the change in capacitance of the capacitor C in re-establishing resonance at the second condition is indicative of the susceptance $B_x$ of the circuit 15 being measured, or more specifically $$B_x=2\pi f(C_2-C_1)$$

where $f$ is the frequency of the oscillator.

In deviating from the strict theory of the present invention and considering it from a more practical standpoint, a number of desirable refinements to the circuit already described will now be discussed. The vacuum tube voltmeter 13 may be adjusted to give a full scale deflection at $V_{12}$ and the scale calibrated to read directly the conductance between the terminals 3 and 2 at any condition of resonance. Also, from the formula $$G_{LC}=\frac{1}{R_s}\left(\frac{V_{12}}{V_{32a}}-1\right)$$

it is evident that the range of the measuring device of the present invention may be increased by having the resistance of resistor $R_s$ changeable within a corresponding range. And, since it is also desirable to have a wide range of effective LC and at the same time use the same capacitor C that is continuously variable within a fixed capacitance range, it will also be apparent that an inductor variable within a wide range is also desirable.

Fig. 4 illustrates a schematic diagram of the measuring circuit incorporating resistor and inductor modifications referred to above, but otherwise the basis of operation of the present invention, as illustrated in Fig. 4, is the same as that of Fig. 2. In Fig. 4 one of the resistors $R_1$, $R_2$ or $R_3$ selected by the switch $S_1$ is the equivalent of the resistor $R_s$ of Fig. 2; and one of the inductors $L_1$ to $L_{11}$ inclusive, as selected by the switch $S_2$ is the equivalent of the inductor L of Fig. 2. Switches $S_1$ and $S_2$ may be any one of a number of well known types of tap changing switches. As illustrated in Fig. 4 inner contact ring 18 and outer contact ring 20 of switch $S_1$ are mounted on a suitable insulating support (not shown) and rotate together as the support is rotated. The connections to rings 18 and 20 from points 3 and 2 respectively are made sufficiently flexible to allow rings 18 and 20 to rotate. This may be accomplished by employing flexible leads or suitable wiping contacts bearing on rings 18 and 20. The contact carried by ring 18 selects the desired resistor for the measuring circuit while the contacts carried by ring 20 return the terminals of the unselected resistors to point 2 which is grounded.

Switch $S_2$ is similar in construction to switch $S_1$, the contact on the inner ring selecting the desired inductor and the contacts on the outer conductor connecting the terminals of the unselected inductors to point 2.

A grounded shield 17 is also provided for oscillator 12. Additional shielding of the circuit is unnecessary.

The invention described in the foregoing specification need not be limited to the details shown, which are considered to be illustrative of one form the invention may take.

The invention described herein may be manufactured and used by or for the Government of the United States of America for Government purposes without the payment of royalty thereon or therefor.

What is claimed is:

1. A measuring device comprising, a source of alternating potential, a resistor, a parallel inductor-capacitor circuit, the capacitor of said circuit having a controllable capacitance, said potential source, resistor and parallel circuit being serially connected, voltage-measuring means, means for coupling the voltage-measuring means across said source and for alternatively coupling the voltage-measuring means across said parallel circuit, and means for connecting an unknown impedance across said parallel circuit.

2. Apparatus as in claim 1, wherein said inductor is adjustable in inductance, and means for indicating the capacitance of said capacitor.

3. A device for measuring the electrical characteristics of an unknown impedance comprising, an oscillator, a resistor having a fixed resistance, a parallel capacitor-inductor circuit, the capacitor of said circuit having a controllable capacitance, means for indicating the capacitance of said capacitor, said resistor and said parallel circuit being serially connected across the output of said oscillator, a vacuum tube voltmeter, a switch having first and second positions, said switch when in said first position coupling said voltmeter across said serially connected resistor and parallel circuit, said switch, when in said second position coupling said voltmeter across said parallel circuit, and means for connecting said unknown impedance in parallel with said parallel circuit.

4. A measuring device comprising, an oscillator, a standard resistor, a parallel inductor-capacitor circuit, the capacitor of said circuit having a controllable capacitance, said resistor and said parallel circuit being serially connected across the output of said oscillator, and means, including a switch having first and second positions for separately measuring the voltage across said serially connected resistor and parallel circuit and the voltage across said parallel circuit, said voltage measuring means, when said switch is in said first position, measuring the voltage across said resistor and parallel circuit, said voltage measuring means, when said switch is in said second position, measuring the voltage across said parallel circuit, and means for connecting an unknown impedance, the characteristics of which are to be measured, across said parallel circuit.

5. A device for measuring the electrical characteristics of an unknown impedance comprising, an oscillator, a resistor, a parallel capacitor-inductor circuit having first and second terminals, means for controlling the capacitance of the capacitor of said circuit, means for indicating the capacitance of said capacitor, said resistor and said parallel circuit being serially connected across the output of said oscillator, means for indicating the resonance and conductance of any circuit included between said first and second terminals, and means for connecting said unknown impedance in parallel with said parallel circuit to form a second parallel circuit between said first and second terminals.

6. A device for measuring the electrical characteristics of an unknown impedance comprising, a radio frequency oscillator having first and second output terminals, a point of reference potential, means coupling said second output terminal of said oscillator to said reference potential point, a plurality of resistors, each of said resistors having first and second terminals and being coupled at its first terminal to said first output terminal of said oscillator, a capacitor having first and second terminals, means for controlling the capacitance of said capacitor, means for indicating the capacitance of said capacitor, said capacitor being coupled at its second terminal to said reference potential point, a first switch for selecting any one of said resistors and coupling it at its second terminal to said first terminal of said capacitor, said switch coupling each of the other of said resistors at its second terminal to said reference potential point, a plurality of inductors each having first and second terminals, each of said inductors being coupled at its first terminal to said reference potential point, a second switch for selecting any one of said inductors and coupling it at its second terminal to said first terminal of said capacitor, said switch coupling the other of said inductors at their second terminals to said reference potential point, a vacuum tube voltmeter having first and second input terminals, said vacuum tube voltmeter being coupled to said reference potential point at its second terminal, a third switch having first and second positions, said third switch when at said first position coupling said first terminal of said capacitor to said first terminal of said vacuum tube voltmeter, said switch when in said second position coupling said oscillator at its first output terminal to said first terminal of said vacuum tube voltmeter, and means for connecting said unknown impedance in parallel with said capacitor.

7. A method of determining the radio frequency admittance of an unknown complex impedance which includes placing a resistance of known value in series with a parallel L-C circuit, impressing a radio frequency voltage of fixed amplitude and frequency across said serially connected resistor and parallel circuit, adjusting the value of the capacitance of the L-C circuit to obtain resonance, measuring the value of capacitance and the voltage across said parallel circuit at resonance, placing said unknown impedance in parallel with said L-C circuit, readjusting the value of the capacitance of said L-C circuit to obtain resonance, measuring the value of the capacitance and the voltage across the parallel circuit formed by said L-C circuit and said unknown impedance at the readjusted resonance, whereby the conductance and susceptance, $G_x$ and $B_x$, respectively, of said unknown impedance may be determined from the following:

$$G_x = \frac{1}{R_s}\left(\frac{V_1}{V_3} - \frac{V_1}{V_2}\right)$$

and $$B_x = 2\pi f(C_2 - C_1)$$

wherein $R_s$ is the value of said resistance, $V_1$ is the amplitude of said impressed radio frequency voltage, $V_2$ is the voltage across said L-C circuit at the first-obtained condition of resonance, $V_3$ is the voltage across the parallel circuit of said L-C circuit and said unknown impedance at the second-obtained condition of resonance, and $C_1$ and $C_2$ are the values of said capacitance at said first- and second-obtained condition of resonance, respectively.

WILLIAM B. BERNARD.

References Cited in the file of this patent

UNITED STATES PATENTS

| Number | Name | Date |
|---|---|---|
| 1,971,310 | Barber | Aug. 21, 1934 |
| 2,111,235 | Avins | Mar. 15, 1938 |
| 2,413,389 | Smith | Dec. 31, 1946 |
| 2,448,581 | Fair | Sept. 7, 1948 |

OTHER REFERENCES

McCool: Tele-Tech, June 1948, pp. 30, 31, 48.

Boella: Proc. of I. R. E., vol. 26, No. 4, April 1938, pp. 421–432.

Sinclair: Proc. of I. R. E., vol. 26, No. 12, December 1938, pp. 1466–1491.